Sept. 10, 1968   I. G. MEIKLEJOHN   3,400,943
HAND-PROPELLED TROLLEYS
Filed July 28, 1966   8 Sheets-Sheet 6

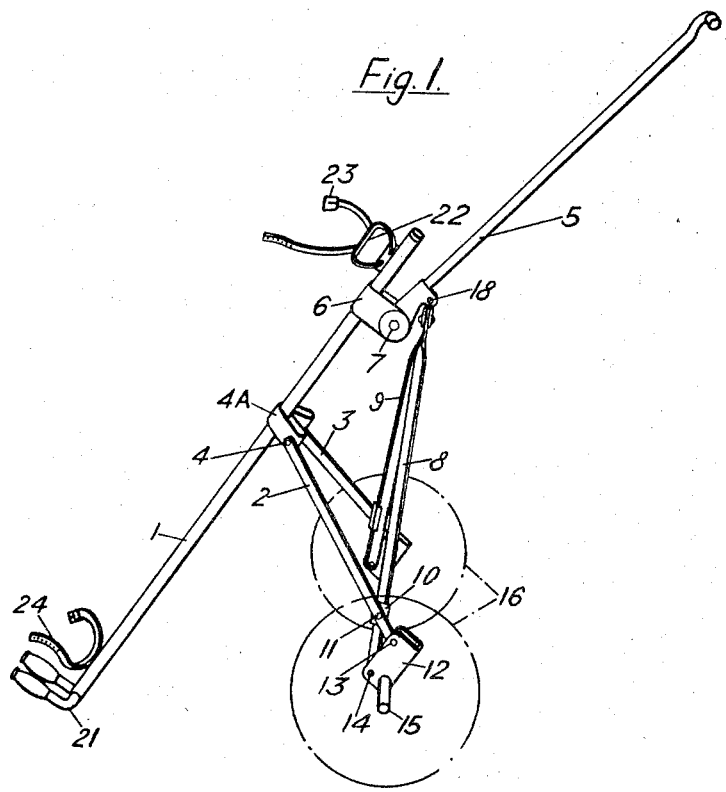

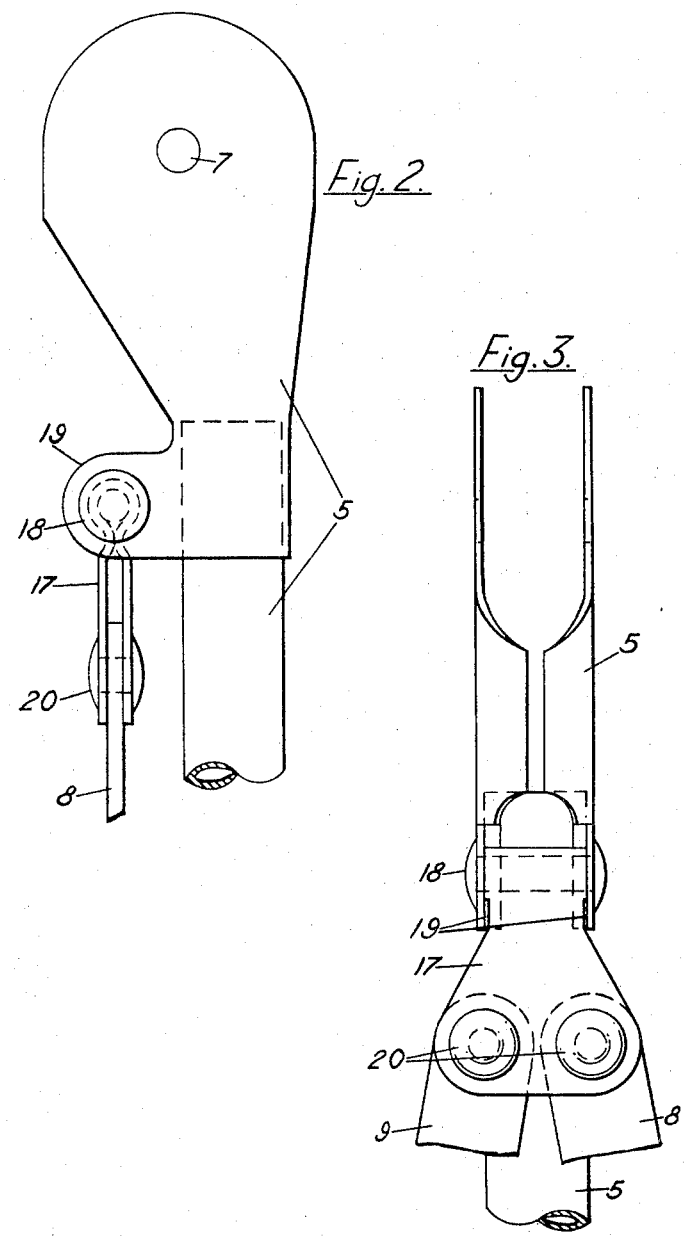

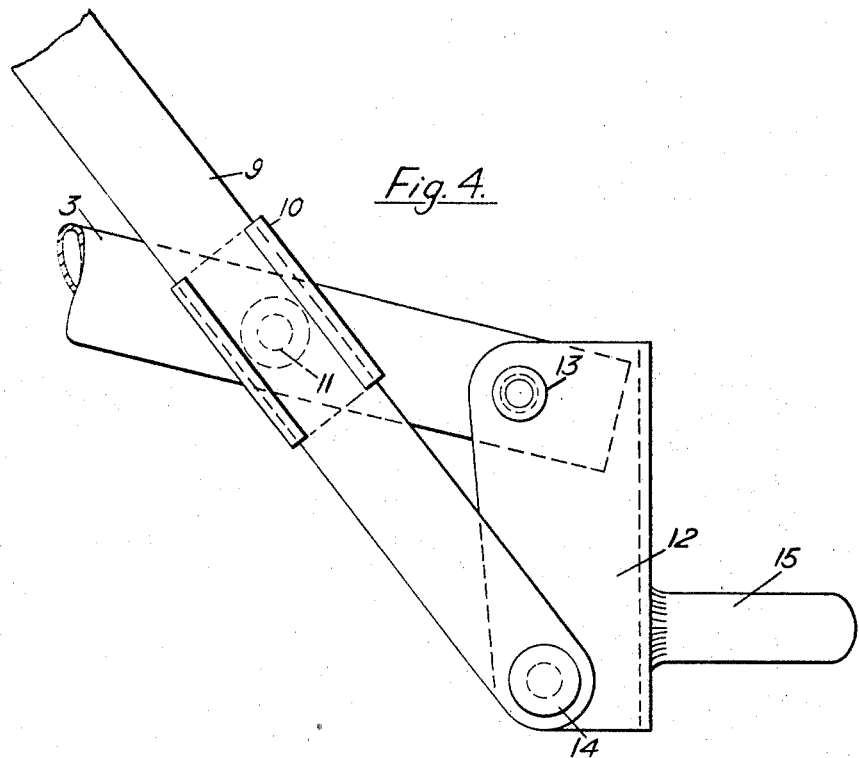
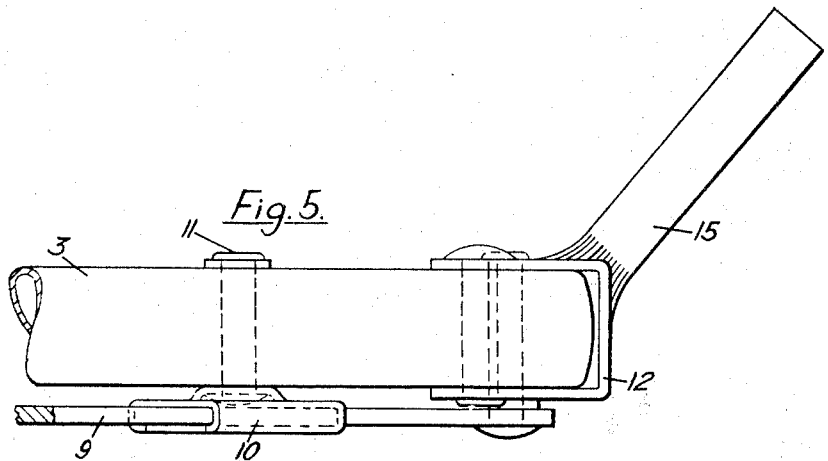

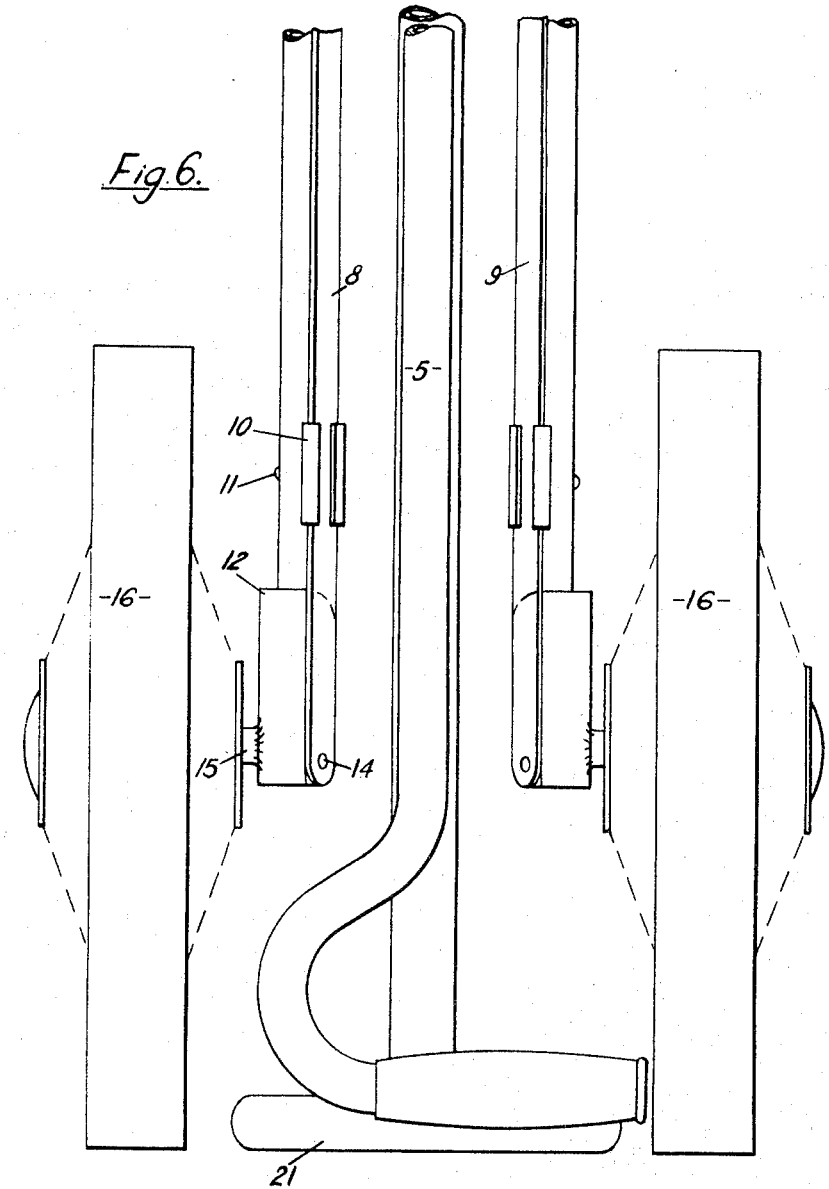

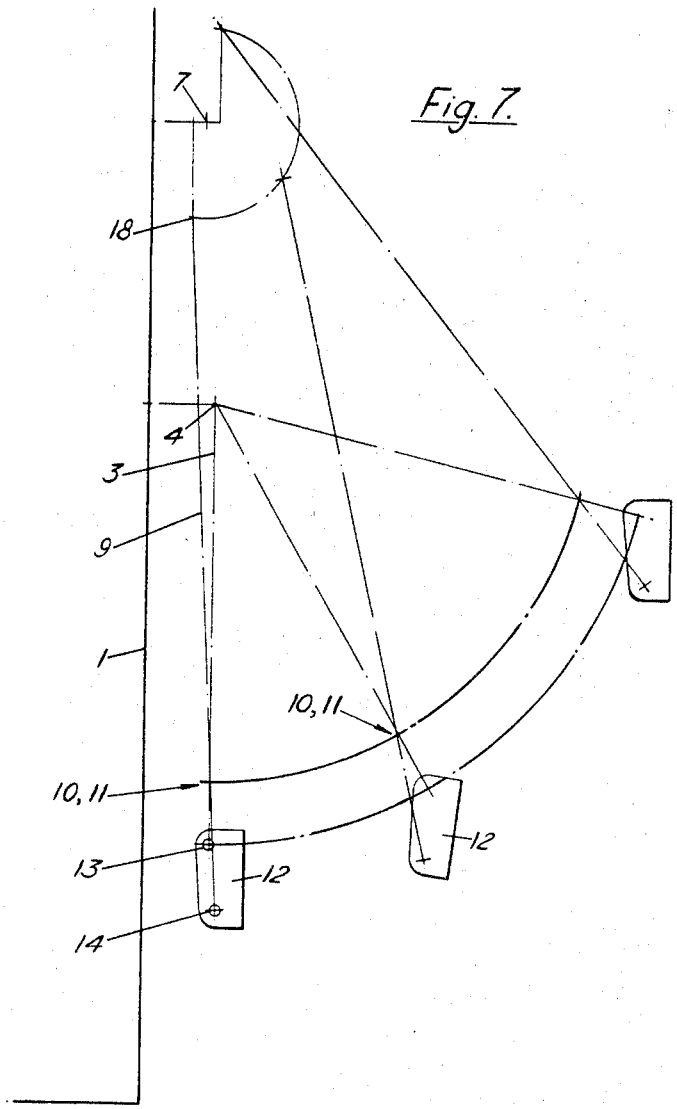

Inventor
IAN G. MEIKLEJOHN
Mason, Fenwick By G. Lawrence
Attorneys

Sept. 10, 1968     I. G. MEIKLEJOHN     3,400,943
HAND-PROPELLED TROLLEYS

Filed July 28, 1966                          8 Sheets-Sheet 7

Inventor
IAN G. MEIKLEJOHN
By Mason, Fenwick & Lawrence
Attorneys

Sept. 10, 1968　　　　I. G. MEIKLEJOHN　　　　3,400,943
HAND-PROPELLED TROLLEYS
Filed July 28, 1966　　　　　　　　　　　　8 Sheets-Sheet 8
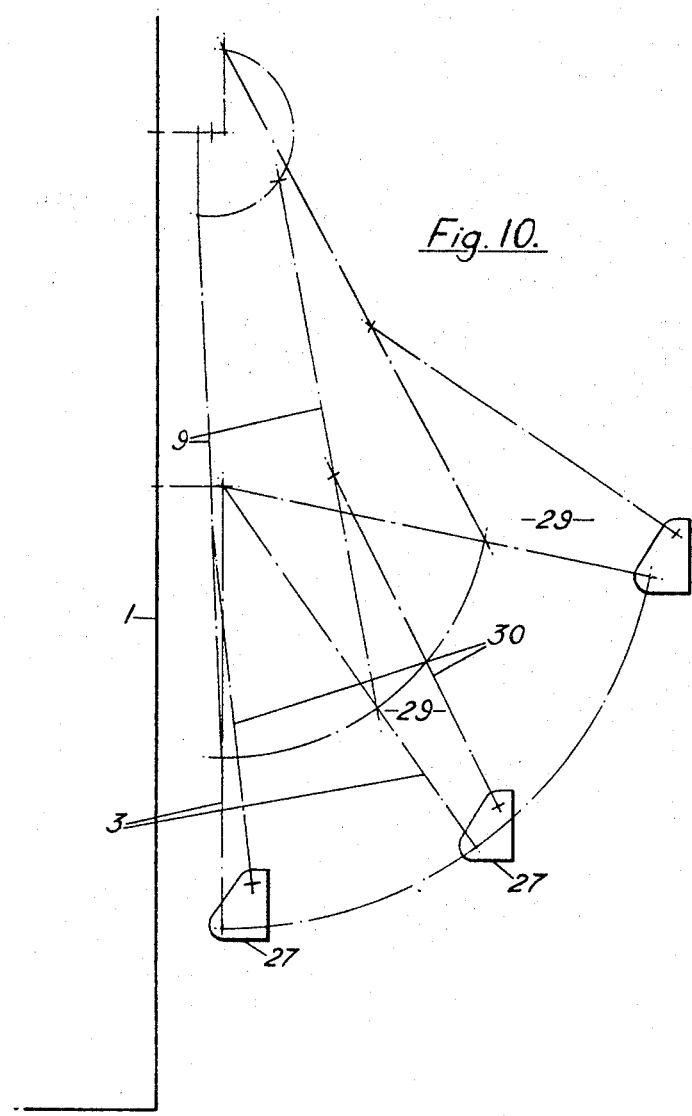
Inventor
IAN G. MEIKLEJOHN
By Mason, Fenwick & Lawrence
Attorneys

United States Patent Office 3,400,943
Patented Sept. 10, 1968

3,400,943
HAND-PROPELLED TROLLEYS
Ian G. Meiklejohn, Kirkcaldy, Scotland, assignor to
I. G. Meiklejohn & Co., Limited
Filed July 28, 1966, Ser. No. 568,627
10 Claims. (Cl. 280—41)

ABSTRACT OF THE DISCLOSURE

A collapsible hand-propelled trolley has a spine, splayed apart wheel-carrying legs on the spine pivotal to stowed position alongside the spine, a pivotal hand arm on the spine, and struts connecting the handle with the legs so that movement of the handle moves the legs. Wheel parallelism in the collapsed position of the trolley is obtained by mounting the wheels on end links on the legs, and connecting the struts to the legs and to the end links in such a way that the struts perform the dual function of moving the legs and simultaneously maintaining the end links against any substantial fore-and-aft tilting movement.

---

This invention relates to hand-propelled trolleys, especially golf-bag trolleys, of the kind having a longitudinal load-supporting spine, a pair of side-by-side legs mounted on the spine for pivotal movement between an outwardly extending splayed-apart in-use position and a collapsed position alongside the spine, a pair of substantially parallel ground wheels movable with the legs to a stowed position alongside the spine, a longitudinal handle arm mounted on the spine for pivotal movement between an extended in-use position and a collapsed position alongside the spine, and a pair of struts connected to the handle arm and to the legs so that pivotal movement of the handle arm effects pivotal movement of the legs.

To ensure compactness and so facilitate stowage of the trolley, say with a golf bag attached thereto, it is very desirable that the pair of trolley wheels should be substantially parallel to each other when in stowed position. Usually this wheel parallelism is obtained by forming the legs as parallelogram linkage systems with the wheels mounted on the end links of the systems.

The object of the invention is to provide improved means for ensuring that the wheels are substantially parallel to each other when in stowed position.

Embodiments of the invention will now be described by way of example with reference to the accompanying drawings in which:

FIG. 1 is a top perspective view of a hand-propelled golf-bag trolley in the in-use position.

FIGS. 2 and 3 are respectively side and front views of a detail at the top of the collapsed trolley.

FIGS. 4 and 5 are respectively side and top plan views of a detail at the bottom of the trolley in the in-use position.

FIG. 6 is a front view of the bottom of the trolley in collapsed position.

FIG. 7 is a schematic side view illustrating the movement of the trolley wheels between extended and stowed positions.

FIGS. 8, 9 and 10 are schematic side views illustrating alternative forms of the invention.

Figure 8:
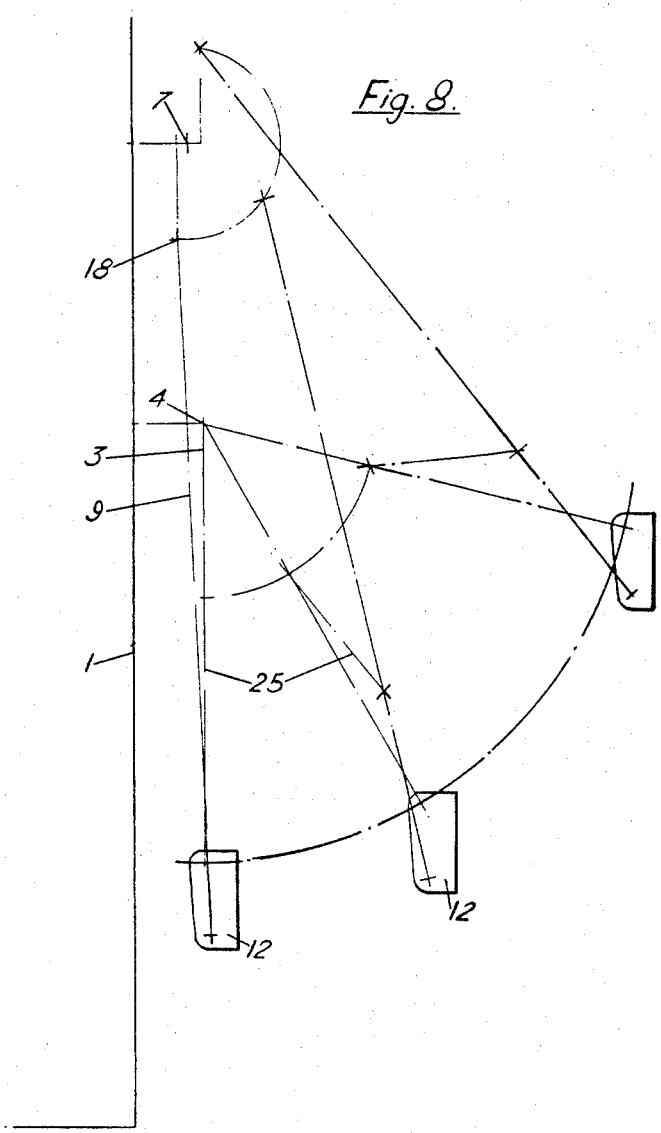

Referring to the drawings:

In FIGS. 1 to 7, a hand-propelled golf-bag trolley consists of a sloped bag-supporting spine 1, a pair of legs 2 and 3 splayed apart at approximately 45° to the central fore-and-aft plane and extending forwards and downwards from the spine intermediate the spine ends and pivotally connected by pins 4 to a bracket 4A on the spine for downward pivotal movement to a collapsed position closely alongside the spine; and upwardly extending handle arm 5 at the top of the spine pivotally connected by a pin 7 to a bracket 6 on the spine for downward pivotal movement to a collapsed position closely alongside the spine; a pair of splayed-apart struts 8 and 9 extending downwards from the handle arm 5 and pivotally connected thereto intermediate the ends thereof, the struts extending across the legs when the legs and struts are in operative position; a pair of intermediate pivotal connections in the form of a pair of guide sleeves 10 pivotally mounted on the insides of the respective legs by pins 11, the struts 8 and 9 slidingly extending through the pivotal guide sleeves; a pair of end links in the form of upright channel members 12 pairs of pivotal connections whereby the end links pivotally interconnecting the outer ends of the struts and legs, the leg ends being secured in the channels by pivot pins 13 and the strut ends being secured to the exterior of the inner flanges of the channels by pivot pins 14; a pair of stub axles 15 on the exterior of the channel members 12; and a pair of ground-engaging wheels 16 on the stub axles and disposed parallel to each other in the in-use position.

The struts 8, 9 are flat, resilient metal strips disposed so as to be capable of resiliently bending laterally inwards towards each other. The flat struts lie in planes which are forwardly divergent at approximately 45° to the central fore-and-aft plane, and each strut has adjacent to its upper end portions approximately a 45° twist (or quarter-turn) whereby the upper end portion lies in a transverse plane. A bifurcated bracket 17 depending from and pivotal fore-and-aft on a transverse pin 18 extending between a pair of lugs 19 projecting from the arm 5 receives the upper ends of the struts 8, 9 and a pair of side-by-side pins 20 secure the strut ends in the bracket while permitting lateral pivoting of the struts from and towards their splayed position. The pivotal connection between the handle arm 5 and the bracket 6 embodies frictionally interengaging plates (not shown) which are brought together by a manual screw (not shown) on the pin 7 to secure the arm releasably in extended position. A U-bracket 21 projecting laterally from the bottom of the spine 1 receives the bottom of the golf bag, and a resilient cradle 22 clamped to the spine 1 at the top thereof receives the top of the bag. Top and bottom straps 23 and 24, with buckles, embrace the bag to secure same on the spine. The end links 12 carry the wheels, and with the legs and the struts and the pivotal connections form a pair of linkage systems whereof the geometry varies to ensure that the stub axles are co-axial when the legs and struts lie in collapsed position close to the spine 1. As illustrated in FIG. 7, the pivotal guide sleeves 10, 11 permit the slight fore-and-aft tilting of the end links 12 which occurs in the movement of the end links between the extended and collapsed positions. With the pivotal mounting at the upper ends of the struts moving through an arcuate path, and the legs moving about fixed pivot points, the struts must be free to bend laterally inwards towards each other during movement of the legs towards and from stowed position. The resilient metal strip forming the struts permits such bending movement.

This simple linkage arrangement ensures that the wheels are substantially parallel in stowed collapsed position, so that the trolley and golf bag together form a compact unit for easy stowage. The struts perform the dual function of moving the legs and simultaneously maintaining the end links against any substantial fore-and-aft tilting movement. Thus, the need for the costly and cumbersome parallelogram linkage system is avoided.

In the arrangement shown in FIG. 8, the linkage of FIG. 7 is modified by omitting the pivotal guide sleeves and substituting a pair of control links 25 pivotally interconnecting the struts and the legs at the inner sides of their intersections. By making the inter-pivot length of the wheel-carrying links 12 different from the inter-pivot length of the control links 25, stabilisation of the linkage systems is achieved. The linkage systems serve to maintain the end links 12 against tilting during the entire movement of the legs between extended and collapsed positions.

Figure 9:
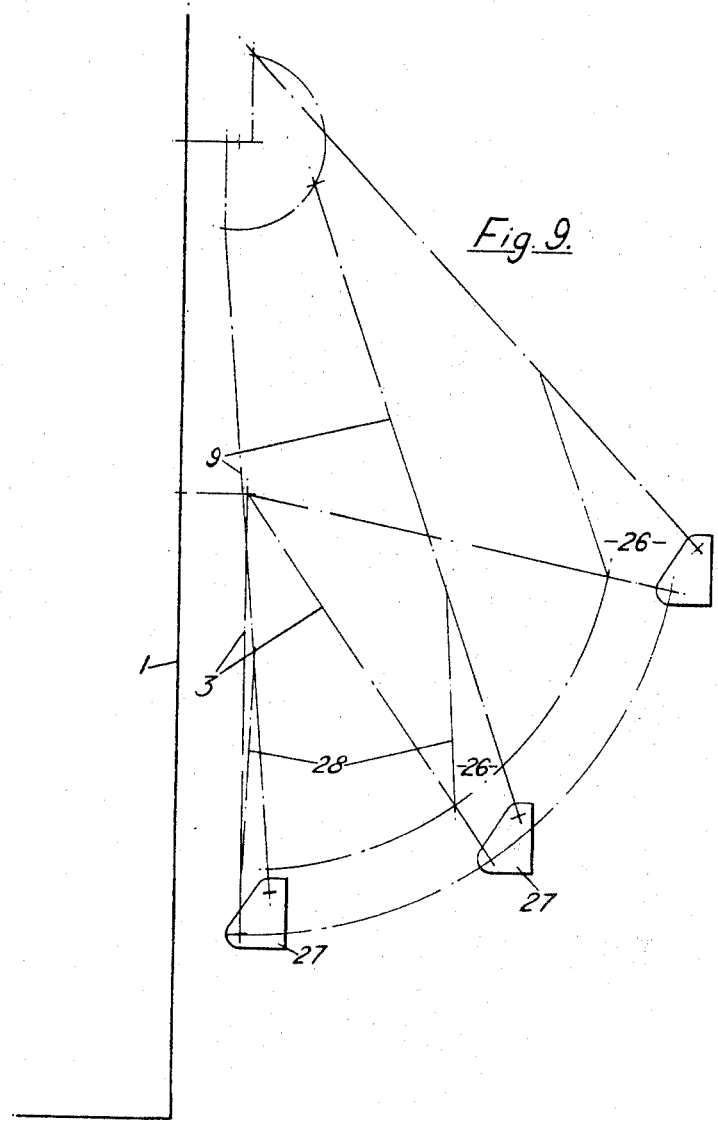

In the arrangement shown in FIG. 9, the struts converge towards the legs, and a pair of triangular channel members 27 carrying the wheels serve as end links pivotally interconnecting the outer ends of the struts and legs. The intermediate pivotal connections consist of a pair of intermediate links 28 pivotally interconnecting the struts and legs intermediate the strut and leg ends so as to form a pair of wheel-carrying quadrilateral linkage systems 26 with the end links and the outer portions of the struts and legs. The end links are retained against tilting throughout the entire collapsing stroke.

In a modification (not shown) of the arrangement of FIG. 9, the intermediate links 28, being pivotally connected at their lower ends to the legs intermediate the ends thereof and at their upper ends to the lugs 19 on the handle arm 5 so as to form with the struts, the end links and the outer portions of the legs a pair of quadrilateral linkage systems of the configuration required to ensure parallelism of the wheels throughout the entire collapsing stroke.

In the arrangement shown in FIG. 10, intermediate pivotal connections pivotally connect the outer ends of the struts to the legs intermediate the leg ends, and the pivotal connections between the struts and the end links 27 consist of a pair of control links 30 connected to the struts intermediate the ends thereof so as to form a pair of quadrilateral linkage systems 29 with the end links and the outer portions of the struts and legs. The end links are retained against tilting throughout the entire collapsing stroke.

It will be appreciated that the simplicity of the foregoing linkage systems as compared with the usual parallelogram linkage systems provides for substantial economies in the amount of material used in the manufacture of the trolley and consequent substantial reduction in the weight of the trolley.

I claim:

1. A hand-propelled trolley comprising a longitudinally extending load-supporting spine, a pair of side-by-side laterally splayed legs pivotally mounted on the spine intermediate the spine ends for movement to a collapsed position alongside the spine, a longitudinally extending handle arm pivotally mounted on an end of the spine for movement to a collapsed position alongside the spine, a pair of wheel-carrying links having one pair of ends pivotally connected to the outer ends of the legs, a pair of side-by-side laterally splayed struts, a pivotal mounting which connects the upper ends of the struts with an intermediate portion of the handle arm to permit combined lateral and fore-and-aft pivotal movement of the struts, and pivotal connections between the struts on the one hand and the legs and the other pair of ends of the wheel-carrying links on the other hand whereby on downward movement of the handle arm the struts move to effect, simultaneously, downward movement of the legs to collapsed position and maintenance of the wheel-carrying links against any substantial fore-and-aft tilting movement so that the wheels in their collapsed position are substantially parallel.

2. A hand-propelled trolley according to claim 1 wherein the struts are resiliently bendable laterally inwards towards each other to permit said downward movement of the legs to the collapsed position.

3. A hand-propelled trolley according to claim 2, wherein the legs are splayed apart at approximately 45° to the central fore-and-aft plane and the struts are flat resilient-metal strips whereof the major portions lie in planes forwardly divergent at approximately 45° to the central fore-and-aft plane and are bendable laterally inwards towards each other and whereof the upper end portions lie in a transverse plane and wherein the pivotal mounting at the upper ends of the struts consists of a bifurcated bracket depending from and pivotal fore-and-aft on the handle arm and a pair of side-by-side pins connecting said upper portions of the struts being connected to the bracket to permit lateral pivoting of the struts.

4. A hand-propelled trolley according to claim 1, wherein the struts converge towards the legs, and the pivotal connections consist firstly of a pair of pivotal joints between the outer ends of the struts and the ends of the wheel-carrying links and secondly a pair of control links connecting the struts to the legs intermediate the ends of the struts and the legs.

5. A hand-propelled trolley according to claim 4, wherein the struts are resiliently bendable laterally inwards towards each other to permit said downward movement of the legs to the collapsed position.

6. A hand-propelled trolley according to claim 1, wherein the struts extend towards intermediate portions of the legs, and the pivotal connections consist of firstly a pair of pivotal joints between the outer ends of the struts and the intermediate portions of the legs and secondly a pair of control links extending between intermediate portions of the struts and the ends of the wheel-carrying links.

7. A hand-propelled trolley according to claim 6, wherein the struts are resiliently bendable laterally inwards toward each other to permit said downward movement of the legs to the collapsed position.

8. A hand-propelled trolley according to claim 2, wherein the struts extend across the legs, and the pivotal connections consist of firstly a pair of guide sleeves pivotally mounted on the legs at their intersections with the struts and slidingly carrying the struts and secondly a pair of pivotal joints between the outer ends of the struts and the ends of the wheel-carrying links.

9. A hand-propelled trolley according to claim 2, wherein the struts extend across the legs, and the pivotal connections consist of firstly a pair of control links connecting the struts to the legs intermediate the ends of the struts and the legs and secondly a pair of pivotal joints between the outer ends of the struts and the ends of the wheel-carrying links.

10. A hand-propelled trolley according to claim 9, wherein the inter-pivot length of each wheel-carrying link is different from the inter-pivot length of each control link.

References Cited

UNITED STATES PATENTS 2,955,834   10/1960   Jaskey.

LEO FRIAGLIA, *Primary Examiner.*

R. SONG, *Assistant Examiner.*